United States Patent Office 2,739,898
Patented Mar. 27, 1956

2,739,898

METHOD OF PRODUCING EGG SUBSTITUTES FOR USE IN THE PRODUCTION OF SPONGES, CAKES, AND SIMILAR BAKED GOODS

Karl Kumetat, Cheltenham, Victoria, Australia, assignor to Commonwealth Scientific and Industrial Research Organization, East Melbourne, Victoria, Australia, a body corporate No Drawing. Application August 3, 1954,
Serial No. 447,679

Claims priority, application Australia August 10, 1953

15 Claims. (Cl. 99—114)

This invention relates to a method of producing from milk protein a substitute for eggs which is of particular value for the production of sponges and similar baked goods.

Eggs are used as constituents of a variety of products. Different properties of the egg are called upon according to the particular use. It is possible to reproduce some of these special properties of eggs by appropriate treatment of milk protein.

In sponge cakes, an essential purpose of the eggs is to produce, with the sugar, a froth which maintains its dispersion of air when the flour is added. It is well known that the formation of froths is favoured by the presence of surface-active substances. Little is known however, of the particular molecular characteristics of the compounds which are most effective in froth-formation, and even less is known of the requirements to make a froth resistant to such additions as flour and sugar, or to make the froth withstand baking. Several methods are known to produce froth from milk protein, such as treatment with lime, but these froths are not stable under the conditions involved in the making and baking of a sponge cake.

A typical formula of an egg sponge is as follows:

6 whole eggs
8 oz. of sugar
8 oz. of flour

The eggs and the sugar are whipped up together, then the flour is carefully blended in. Baking is done at 200–225° C. for usually 20–30 minutes.

The object of this invention is to provide a product capable of replacing the larger part of the eggs in sponges, cakes and similar baked goods, and especially in egg sponges using sugar and flour in approximately the proportions set out in the above typical formula. This object is achieved by the method forming the subject of this invention.

The desired product may be prepared from skim milk or casein with or without minor amounts of lactalbumen or lactglobulin. If skim milk is used it should be concentrated, as for example to 25% solids.

The method, according to this invention, of producing a substitute for eggs in sponges, cakes, and similar baked goods comprises treating milk protein with a calcium sequestering agent in the acid pH range (i. e. at a pH less than 7), and then raising the pH of this mixture to substantially above 7 (i. e. substantially into the alkaline range), both steps in the method being carried out at temperatures not exceeding 60° C. By a "calcium sequestering agent" is meant an agent which has the property of substantially reducing the concentration of calcium ions in the solution to which it is added.

If either or both of these two steps are carried out at temperatures above 60° C., there is a serious tendency for the proteins to be de-natured. This tendency progressively increases with such rises in temperature above 60° C. As explained below, the length of each step in the treatment largely depends upon the temperature at which it is carried out and becomes progressively shorter as the temperature used is increased. Suitable times of treatment in the first step are, for example, 16 hours at 5° C. or progressively shorter periods as the temperature is increased, until at 45° C., treatment for one hour is sufficient. In general, it may be said that the time of treatment in the first step is halved for each 10° rise in temperature. Accordingly, as the optimum time of treatment at 45° C. is approximately 1 hour, the time of treatment may be expressed mathematically as a function of the temperature according to the following equation:

$$R = 2^{\frac{45-T}{10}}$$

where R is the time of treatment in hours and T is the temperature in degrees centigrade.

In the second step, as above-mentioned, the pH is raised to substantially above 7 (as, for example, to pH 9). The length of treatment in this second step is not as important as in the first step. It has been found, for example, that suitable treatment times are 2 hours at 45° C., 10 minutes at 60° C., or 30 minutes during which the mixture is cooled from 60° C. to 20° C. The products obtained in this way may be applied in the liquid form or they may be dried to form a powder.

If the pH is raised to too high a figure in the second step of the process, the alkaline conditions may cause the product to deteriorate rather too rapidly and also may cause it to affect the flour adversely and to render the resultant cake mixture rather more sensitive to temperature variations than is desirable. These imperfections in the product are to an appreciable extent due to a further rise in pH that occurs when carbon dioxide is driven off during drying. They may be overcome, or at least reduced to a degree where they are negligible, by adding one or more edible acids on the completion of the second step of the treatment so as to reduce the alkalinity of the egg-substitute. Suitable acids are citric, hydrochloric, phosphoric and lactic, for example.

The chemicals employed in the first stage and designated as calcium sequestering agents may comprise alkali metal pyrophosphates, alkali metal metaphosphates, alkali metal polyphosphates and alkali metal citrates. Preferred compounds are sodium acid pyrophosphate, sodium hexametaphosphate and sodium citrate. The chemicals applied in the second step are alkaline reagents capable of raising the pH value, as for example sodium hydroxide, trisodium phosphate, sodium carbonate and mixtures of any of these substances with or without sodium bicarbonate.

A typical example of a method of obtaining a product capable of replacing eggs in sponge cake is as follows:

To 1000 lb. of skim milk concentrate with 25% solids at about 20° C. an aqueous solution of 9 lb. of sodium hexametaphosphate is added. The mixture is then heated to 60° C. over a period of about half an hour and an aqueous solution of 5 lb. of sodium carbonate and 5 lb. sodium bicarbonate is then added. The mixture is then cooled to about 20° C. over a period of about half an hour and an aqueous solution of 4.75 lb. of citric acid (mono-hydrate) is carefully stirred in.

The mixture can be spray-dried to give a powder of pH 8.8 or it can be used in liquid form. This powder may be used for making a sponge cake according to the following recipe—

3½ oz. of substitute powder
10 oz. of water
1 egg
10 oz. of castor sugar
10 oz. of flour

*Procedure.*—Dissolve the substitute powder in the water and add the egg-white. Whip them up together with sugar, and add the egg-yolk at low speed. Sieve the flour and blend it into the mix. Bake at about 205° C. for about 30 minutes.

Similar results could be obtained by substituting casein or casein with minor amounts of lactalbumen or lactglobulin for the skim milk concentrate in the above example.

A treatment of skim milk with sodium pyrophosphate or sodium metaphosphate in the acid range and afterwards neutralising the mixture with sodium carbonate is described in United States Patent No. 2,341,425 in connection with the production of a colloid, but not for the purpose of this invention. Also, the conditions described differ from those of the method according to this invention for the production of an egg substitute suitable for use in the production of sponges and similar baked goods. The second step in that previously described process is not carried out in the alkaline range, which is an essential characteristic of this invention, and the temperatures employed in the first stage of that previously described process are 60°–70° C. and in the second stage 70°–80° C. According to my investigations, these temperatures, as above-mentioned, are higher than is desirable in the production of a substitute for eggs in sponge cake. In the treatment according to this invention, the temperature throughout should be kept below 60° C.

While a treatment according to the previous process quoted above may result, as it is claimed, in the production of an emulsifying agent, it is not suitable for obtaining an egg substitute for sponge cake; but this can be achieved by the treatment according to this invention.

I claim:

1. The method of producing egg substitutes for use in the production of sponges, cakes and similar baked goods which comprises mixing a calcium sequestering agent selected from the group consisting of alkali metal pyrophosphates, alkali metal metaphosphates, alkali metal polyphosphates and alkali metal citrates with a substance selected from the group consisting of skim milk, casein and casein with minor amounts of lactalbumen and lactglobulin in the acid pH range and then adding an alkaline reagent to raise the pH of the mixture to a figure substantially above 7, both steps in the method being carried out at temperatures not exceeding 60° C.

2. The method of producing egg substitutes for use in the production of sponges, cakes and similar baked goods which comprises mixing a calcium sequestering agent selected from the group consisting of alkali metal pyrophosphates, alkali metal metaphosphates, alkali metal polyphosphates and alkali metal citrates with a substance selected from the group consisting of skim milk, casein and casein with minor amounts of lactalbumen and lactglobulin in the acid pH range and then adding an alkaline reagent to raise the pH of the mixture to a figure substantially above 7, both steps in the method being carried out at temperatures not exceeding 60° C. and the time of treatment in the first step being substantially in accordance with the equation $$R = 2^{\frac{45-T}{10}}$$

where R is the time of treatment in hours and T is the temperature in degrees centigrade.

3. The method of producing egg substitutes for use in the production of sponges, cakes and similar baked goods which comprises mixing a calcium sequestering agent selected from the group consisting of alkali metal pyrophosphates, alkali metal metaphosphates, alkali metal polyphosphates and alkali metal citrates with a substance selected from the group consisting of skim milk, casein and casein with minor amounts of lactalbumen and lactglobulin in the acid pH range, adding an alkaline reagent to raise the pH of the mixture to a figure substantially above 7, and then adding an edible acid to reduce the alkalinity of the product, the first two steps in the method being carried out at temperatures not exceeding 60° C.

4. The method of producing egg substitutes for use in the production of sponges, cakes and similar baked goods which comprises mixing a calcium sequestering agent selected from the group consisting of alkali metal pyrophosphates, alkali metal metaphosphates, alkali metal polyphosphates and alkali metal citrates with a substance selected from the group consisting of skim milk, casein and casein with minor amounts of lactalbumen and lactglobulin in the acid pH range, adding an alkaline reagent to raise the pH of the mixture to a figure substantially above 7, and then adding an edible acid to reduce the alkalinity of the product, the first two steps in the method being carried out at temperatures not exceeding 60° C. and the time of treatment in the first step being substantially in accordance with the equation $$R = 2^{\frac{45-T}{10}}$$

where R is the time of treatment in hours and T is the temperature in degrees centigrade.

5. The method according to claim 3 in which the alkaline reagent consists of at least one substance selected from the group consisting of sodium hydroxide, trisodium phosphate and sodium carbonate.

6. The method according to claim 3 in which the alkaline reagent consists of sodium bicarbonate and at least one substance selected from the group consisting of sodium hydroxide, trisodium phosphate and sodium carbonate.

7. The method according to claim 4 in which the alkaline reagent consists of at least one substance selected from the group consisting of sodium hydroxide, trisodium phosphate and sodium carbonate.

8. The method according to claim 4 in which the alkaline reagent consists of sodium bicarbonate and at least one substance selected from the group consisting of sodium hydroxide, trisodium phosphate and sodium carbonate.

9. The method according to claim 3 in which the edible acid consists of at least one substance selected from the group consisting of citric acid, hydrochloric acid, phosphoric acid and lactic acid.

10. The method according to claim 4 in which the edible acid consists of at least one substance selected from the group consisting of citric acid, hydrochloric acid, phosphoric acid and lactic acid.

11. The method of producing egg substitutes for use in the production of sponges, cakes and similar baked goods which comprises mixing a calcium sequestering agent with a substance selected from the group consisting of skim milk, casein and casein with minor amounts of lactalbumen and lactglobulin in the acid pH range and then adding an alkaline reagent to raise the pH of the mixture to a figure substantially above 7, both steps in the method being carried out at temperatures not exceeding 60° C.

12. The method of producing egg substitutes for use in the production of sponges, cakes and similar baked goods which comprises mixing a calcium sequestering agent with a substance selected from the group consisting of skim milk, casein and casein with minor amounts of lactalbumen and lactglobulin in the acid pH range and then adding an alkaline reagent to raise the pH of the mixture to a figure substantially above 7, both steps in the method being carried out at temperatures not exceeding 60° C. and the time of treatment in the first step being substantially in accordance with the equation $$R = 2^{\frac{45-T}{10}}$$

where R is the time of treatment in hours and T is the temperature in degrees centigrade.

13. The method of producing egg substitutes for use in the production of sponges, cakes and similar baked goods which comprises mixing a calcium sequestering agent with a substance selected from the group consisting of skim milk, casein and casein with minor amounts of lactalbumen and lactglobulin in the acid pH range adding an alkaline reagent to raise the pH of the mixture to a figure substantially above 7, and then adding an edible acid to reduce the alkalinity of the product, the first two steps in the method being carried out at temperatures not exceeding 60° C.

14. The method of producing egg substitutes for use in the production of sponges, cakes and similar baked goods which comprises mixing a calcium sequestering agent with a substance selected from the group consisting of skim milk, casein and casein with minor amounts of lactalbumen and lactglobulin in the acid pH range, adding an alkaline reagent to raise the pH of the mixture to a figure substantially above 7, and then adding an edible acid to reduce the alkalinity of the product, the first two steps in the method being carried out at temperatures not exceeding 60° C. and the time of treatment in the first step being substantially in accordance with the equation $$R = 2^{\frac{45-T}{10}}$$

where R is the time of treatment in hours and T is the temperature in degrees centigrade.

15. The method of producing egg substitutes for use in the production of sponges, cakes and similar baked goods which comprises adding an aqueous solution of sodium hexametaphosphate to a skim milk concentrate with 25% solids at about 20° C., heating to 60° C. over a period of about half an hour, adding an aqueous solution of equal parts by weight of sodium carbonate and sodium bicarbonate to raise the pH value from below 7 to substantially above 7, cooling the mixture to about 20° C. over a period of about half an hour and then stirring in a solution of citric acid to reduce the pH value to about 8.8.

References Cited in the file of this patent

UNITED STATES PATENTS

| | | |
|---|---|---|
| 2,341,425 | Curry | Feb. 8, 1944 |
| 2,468,677 | Lindewald | Apr. 26, 1949 |

FOREIGN PATENTS

| | | |
|---|---|---|
| 637,506 | Great Britain | May 24, 1950 |

OTHER REFERENCES

"Egg Substitutes," by Kahlenberg, The Bakers Digest, February 1951, page 16.